United States Patent [19]

Melberg

[11] Patent Number: 5,440,460
[45] Date of Patent: Aug. 8, 1995

[54] LIGHT LEDGE FOR A LEVEL GLASS
[75] Inventor: Tollak Melberg, Stavanger, Norway
[73] Assignee: Technor AS, Norway
[21] Appl. No.: 137,307
[22] Filed: Oct. 15, 1993
[30] Foreign Application Priority Data Oct. 16, 1992 [NO] Norway ................... 924013

[51] Int. Cl.$^6$ ............................................. F21V 33/00
[52] U.S. Cl. ..................... 362/101; 362/29; 362/800
[58] Field of Search ................. 362/26, 29, 31, 32, 362/101, 800, 23, 30

[56] References Cited

U.S. PATENT DOCUMENTS

| | | | |
|---|---|---|---|
| 1,760,727 | 5/1930 | Von Hofe | 362/26 |
| 5,027,258 | 6/1991 | Schoniger et al. | 362/800 |
| 5,084,698 | 1/1992 | Sell | 362/29 |
| 5,151,679 | 9/1992 | Dimmick | 362/800 |
| 5,193,895 | 3/1993 | Naruke et al. | 362/800 |
| 5,239,450 | 8/1993 | Wall | 362/31 |
| 5,241,457 | 8/1993 | Sasajima et al. | 362/800 |

FOREIGN PATENT DOCUMENTS

| | | | |
|---|---|---|---|
| 1166442 | 10/1969 | United Kingdom | F21Q 3/00 |
| 1536269 | 11/1977 | United Kingdom | F21Q 3/00 |

Primary Examiner—James C. Yeung
Attorney, Agent, or Firm—Head & Johnson

[57] ABSTRACT

A light ledge device for a level instrument. The ledge device includes at least one light emitting diode. A translucent ledge has a cavity for receiving each light emitting diode. Each cavity is shaped so that each diode tightly joins the ledge.

3 Claims, 2 Drawing Sheets

LIGHT LEDGE FOR A LEVEL GLASS

BACKGROUND AND SUMMARY OF THE INVENTION

The invention relates to a light ledge for a level or gauge glass. Gauge or level glasses for liquids may advantageously be read against a background illumination, and it is known to mount a light source along one side of a level glass and read the liquid level from the opposite side. Level glasses are frequently mounted in process plants where explosion risks exist and, therefore, very high standards are required of the design of light sources. Good light ledges for shining through level glasses may advantageously consist of light emitting diodes mounted in a row. Light emitting diodes are stout and rugged, use little current and have a long useful life compared with electrical bulbs. For use in explosion hazardous areas, light emitting diodes having current feed, must be cast into a gas-tight casting mass.

Upon casting-in, one should avoid that casting mass covers the lighting part of the light emitting diodes. It is known to attach short pipes of plastic or metal with one end tight against a glass ledge and let said pipes serve as carrier for light emitting diodes which are fixed to and electrically coupled on a circuit board. Often, the pipes have a reflecting inner surface and may be funnel-shaped, each pipe, in addition to a casting formwork, serving as a light reflector. Upon mounting, the circuit board with the diodes is moved towards the glass ledge, the pipes orientated such that each light emitting diode slides into the open end of a pipe and becomes covered thereby. During casting-in or encapsulating, the pipes serve as formworks, preventing casting mass from penetrating inwards to the lighting part of the light emitting diodes. Light may thereby pass unimpeded from the light emitting diode within each pipe and out through the glass ledge.

A disadvantage of the construction described is that the manufacture is time-consuming and expensive. Each pipe, which is to cover a light emitting diode, must be sealed completely into the light emitting diode, requiring that the pipe is split and formed in a resilient material. Each pipe must be mounted beforehand on the glass ledge, e.g. with glue. Each light emitting diode must be passed so far into the pipe that the split is covered, in order to avoid that casting mass penetrate into the pipe. Again, this requires accurate mounting of the light emitting diodes on the circuit board.

The object of this invention is to provide a simple encapsulatable light ledge having light emitting diodes, and wherein said disadvantages are avoided.

According to the invention, the object is achieved through the features defined in the following claims. An exemplary embodiment of the invention is described in the following, reference being made to the attached drawings.

DESCRIPTION OF THE PREFERRED EMBODIMENT

Figure 1:
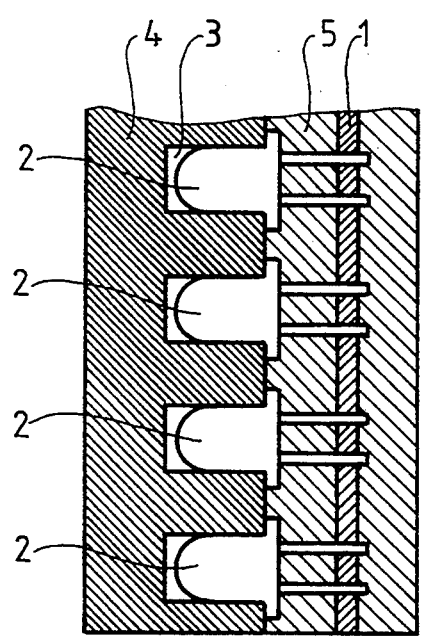
FIG. 1 shows, partly in section and partly in a side elevational view, a portion of a light ledge wherein a circuit board having a row of light emitting diodes is casted together with a glass ledge.

In the drawings, reference numeral 1 denotes a circuit board having light emitting diodes 2, which are passed into tight cavities 3 of a transparent ledge 4 of glass or plastic. Tight casting mass 5 seals the structure so that it appears as one component. When the light emitting diodes 2 are supplied with electrical power through an electrical coupling, not shown, light may pass unimpeded from the light emitting diodes 2 through the ledge 4 and further through a level glass filled with liquid. The ledge 4 constitutes a light conductor which will catch lateral light from the light emitting diodes 2. The light conducting effect of the ledge 4 is dependent on material choice and surface.

Figure 2:
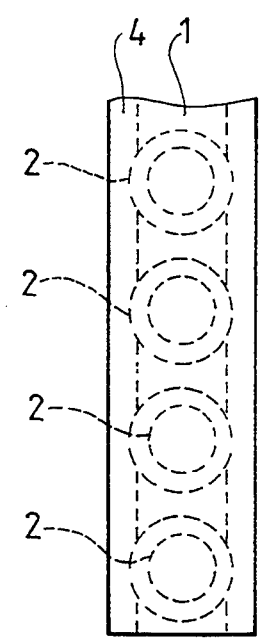
FIG. 2 shows a portion of a light ledge, corresponding to FIG. 1, but seen in a front view.

FIG. 2 illustrates a front view of the ledge 4 with the circuit board 1 and diodes 2 illustrated by dashed lines.

Figure 3:
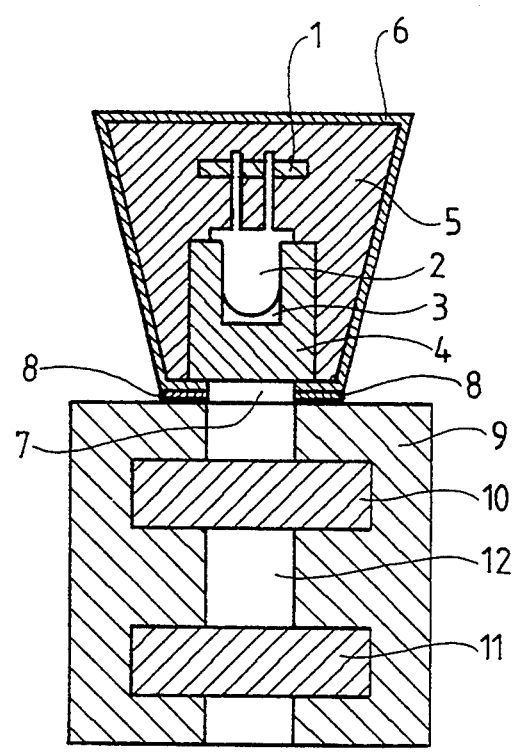
FIG. 3 shows, partly in section and partly in a top plan view, a light ledge mounted against a level glass.

FIG. 3 shows a light ledge wherein a circuit board having a light emitting diode 2 and a transparent ledge 4 are cast into an enclosure 6 surrounding tight casting mass 5. Around a light aperture 7 in the enclosure 6, a packing 8 rests tightly against a level glass comprising a housing 9 having two separate glass walls 10 and 11. Liquid 12, e.g. from a liquid tank, not shown, is conducted in between the glass walls 10 and 11. Light from the light emitting diode 2 passes through the translucent ledge 4, the light aperture 7 and the glass walls 10, 11. When the space between the glass walls 10 and 11 is filled with liquid 12, the light passage is wholly or partly prevented by the liquid, whereby the liquid level between the glass walls 10 and 11 easily may be observed.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A light ledge for a level instrument, which ledge device comprises:
    at least one light emitting diode connected, mounted and wired to a circuit board;
    a translucent ledge having a cavity for receiving each said light emitting diode, each said cavity shaped so that each said diode tightly joins said ledge for a fluid tight seal around each said diode, wherein each said diode and each said ledge are sealed and encapsulated within a tight casting mass;
    means to seal each said diode with said translucent ledge and with said circuit board; and
    a packing comprising a housing having separated glass walls for conducting liquid between said glass walls, wherein said packing rests tightly against said translucent ledge.

2. A light ledge device as set forth in claim 1 wherein said translucent ledge is transparent.

3. A light ledge device as set forth in claim 2 having a plurality of aligned light emitting diodes.

* * * * *